United States Patent
Ramaswamy et al.

(10) Patent No.: US 6,754,194 B2
(45) Date of Patent: Jun. 22, 2004

(54) METHOD AND APPARATUS FOR INDICATING THE PRESENCE OF A WIRELESS LOCAL AREA NETWORK BY DETECTING SIGNATURE SEQUENCES

(75) Inventors: Kumar Ramaswamy, Plainsboro, NJ (US); Louis Robert Litwin, Jr., Plainsboro, NJ (US); Paul Gothard Knutson, Lawrenceville, NJ (US); Wen Gao, Plainsboro, NJ (US); Charles Chuanming Wang, Jamison, PA (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/243,228

(22) Filed: Sep. 13, 2002

(65) Prior Publication Data

US 2004/0052231 A1 Mar. 18, 2004

(51) Int. Cl.⁷ .............................................. H04Q 7/00
(52) U.S. Cl. ........................................ 370/331; 370/338
(58) Field of Search ................................. 370/328, 331, 370/332, 338, 351–356, 401, 389; 455/422, 432, 436–444

(56) References Cited

U.S. PATENT DOCUMENTS

| | | | | |
|---|---|---|---|---|
| 2001/0024953 A1 | * | 9/2001 | Balogh ...................... | 455/432 |
| 2001/0046839 A1 | * | 11/2001 | Latva-Aho et al. ........ | 455/3.05 |
| 2002/0085540 A1 | * | 7/2002 | Hyvarinen et al. ......... | 370/352 |
| 2002/0147008 A1 | * | 10/2002 | Kallio ........................ | 455/426 |
| 2003/0112789 A1 | * | 6/2003 | Heinonen ................... | 370/349 |

* cited by examiner

Primary Examiner—Ajit Patel
(74) Attorney, Agent, or Firm—Joseph S. Tripoli; Harvey D. Fried; Joseph J. Kolodka

(57) ABSTRACT

A method and apparatus for detecting the presence of a wireless local area network (WLAN) (104) detects at least one signature sequence in a radio frequency (RF) signal associated with a WLAN (104). The present invention indicates the presence of a WLAN (104) in response to the detection of the at least one signature sequence in the RF signal.

21 Claims, 9 Drawing Sheets

METHOD AND APPARATUS FOR INDICATING THE PRESENCE OF A WIRELESS LOCAL AREA NETWORK BY DETECTING SIGNATURE SEQUENCES

CROSS-REFERENCE TO RELATED APPLICATIONS

This patent application is related to simultaneously filed U.S. patent application Ser. Nos. 10/243,905 and 10/246,263, which patent applications are incorporated herein by reference in their respective entireties.

BACKGROUND OF THE INVENTION

1. Field of the Invention

The present invention generally relates to communication systems and, more particularly, to a method and apparatus for detecting the presence of a wireless local area network.

2. Description of the Related Art

Presently, 2.5 generation (2.5G) and third generation (3G) cellular networks can provide wireless data service, such as wireless Internet service, having data rates up to 2 Mbps. On the other hand, wireless local area networks (WLANs), such as IEEE 802.11a, IEEE 802.11b, and HiperLAN/2 wireless networks, for example, can provide data service with rates higher than 10 Mbps. WLAN service is also typically cheaper to implement than cellular service due to the use of unlicensed frequency bands by WLANs. As such, it is desirable to switch from cellular service to WLAN service when a mobile device is within the service area of a WLAN. Switching between cellular service and WLAN service can provide for optimal utilization of the available spectrum, and can reduce the burden on cellular networks during times of peak activity.

Mobile devices typically have limited power resources. Continuously checking for the presence of a WLAN by powering up a complete WLAN subsystem can result in considerable power drain. Thus, there is a need to minimize power used by mobile devices capable of communicating with multiple types of wireless networks, such as cellular and WLAN networks.

SUMMARY OF THE INVENTION

The present invention is a method and apparatus for indicating the presence of a wireless local area network (WLAN). Specifically, the present invention detects at least one signature sequence in a radio frequency (RF) signal associated with a WLAN. In one embodiment, the present invention filters samples of the RF signal to correlation the RF signal with a stored signature sequence indicative of a WLAN. The correlated RF signal is then coupled to a peak detector for sensing at least one peak therein. The present invention indicates the presence of a WLAN in response to the detection of the at least one signature sequence in the RF signal.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for detecting the presence of a wireless local area network (WLAN). The present invention will be described within the context of transferring communications in a mobile device from a cellular telephone network to a WLAN when the mobile device is located within the service area of the WLAN. Those skilled in the art, however, will appreciate that the present invention can be advantageously employed in any communication device that is capable of communicating with a WLAN. Thus, the present invention has broad applicability beyond the communication systems described herein.

Figure 1:
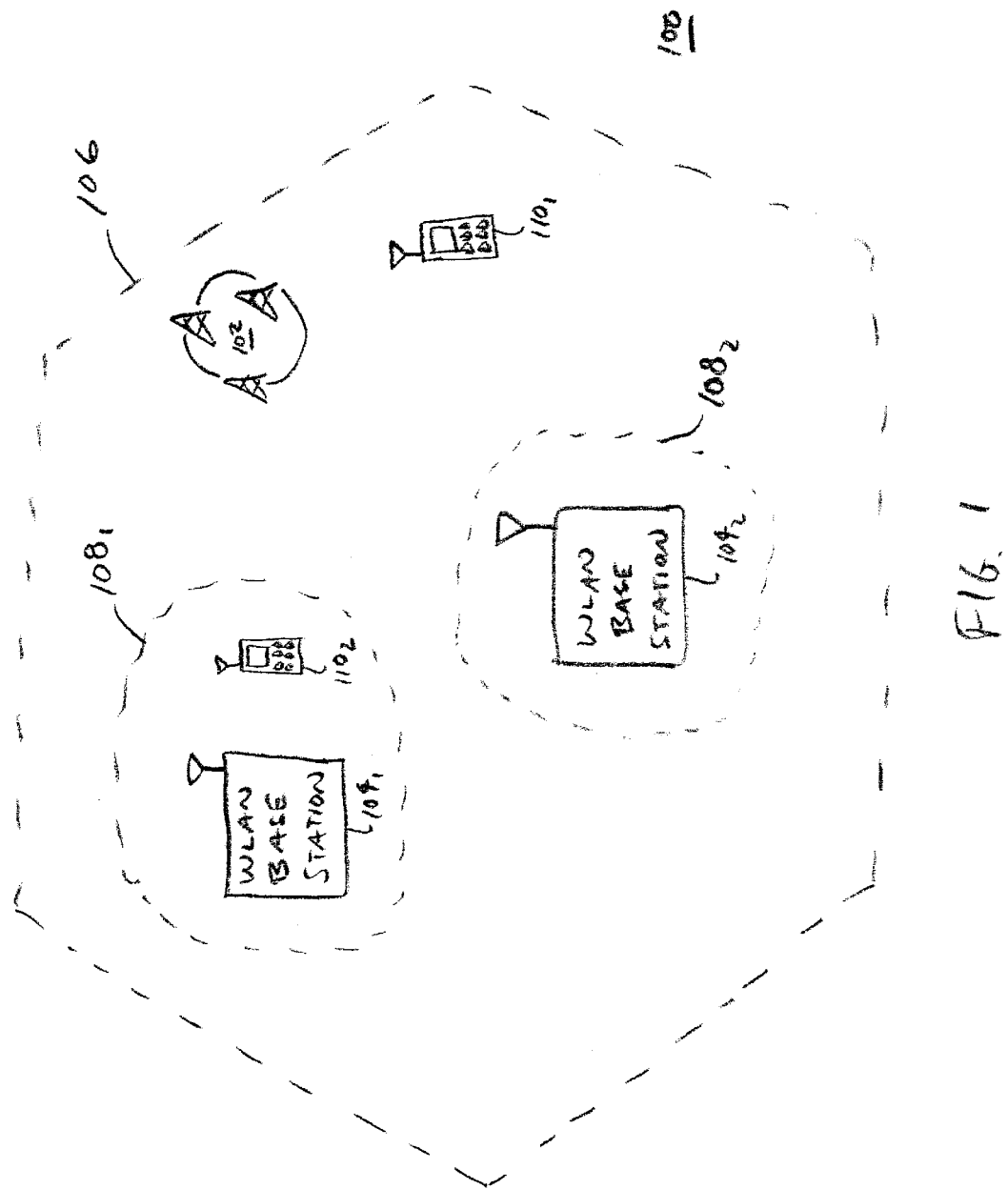
FIG. 1 depicts a communication system in which the present invention may be advantageously employed.

FIG. 1 depicts a communication system 100 in which the present invention may be advantageously employed. The communication system 100 comprises a wireless communication network 102, a plurality of WLAN access points 104 (e.g., WLAN access points $104_1$ and $104_2$), and a plurality of mobile devices 110 (e.g., mobile devices $110_1$ and $110_2$). The wireless communication network 102 provides service to mobile devices 110 located within a service area 106 (e.g., mobile devices $110_1$ and $110_2$). For example, the wireless communication network 102 can comprise a cellular telephone network providing voice and/or data services to mobile devices 110 within the service area 106. The WLAN access points $104_1$ and $104_2$ provide service to mobile devices 110 located within service areas $108_1$ and $108_2$, respectively (e.g., mobile device $110_2$ located within service area $108_1$). For example, the WLAN access points 104 can comprise IEEE 802.11b WLAN access points providing voice and/or data services to mobile devices 110 within the service areas 108. The communication system 100 is illustratively shown having non-overlapping service areas 108 corresponding to the WLAN access points 104 that are located with the service area 106 corresponding to the wireless communication network 102. Other arrangements can be used with the present invention, such as overlapping service areas 108.

As described below, the present invention allows each of the mobile devices 110 to detect the presence of a WLAN. As such, the present invention enables each of the mobile devices 110 to communicate with one or more of the WLAN access points 104, rather than the wireless communication network 102, when the mobile device 110 is located within the service areas 108. For example, mobile device $110_2$, which is located within service area $108_1$, is capable of communicating with WLAN access point $104_1$ and wireless communication system 102. Thus, mobile device $110_2$ can transfer communications between WLAN access point $104_1$ and wireless communication system 102 as desired. Mobile device $110_1$, however, will continue to communicate with the wireless communication system 102 until the mobile device $110_1$ moves within one or more of the service areas 108 of the WLAN access points 104.

The decision to switch between the wireless communication system 102 and the WLAN can be made at the mobile device 110 or by the intelligence in the wireless communication system 102. For the wireless communication system 102 to make the decision, the wireless communication system 102 requires precise knowledge of the location of the mobile device 110 and the location of the WLAN access points 104. The location of the mobile device 110 can be obtained precisely, for example, by using a Global Positioning System (GPS) receiver in the mobile device 110, and sending the coordinates to the wireless communication system 102. Such a system is described in commonly assigned patent application Ser. No. 10/243,905, which is incorporated by reference in its entirety. In accordance with the present invention, the decision to switch is made by the mobile device 110.

Figure 2:
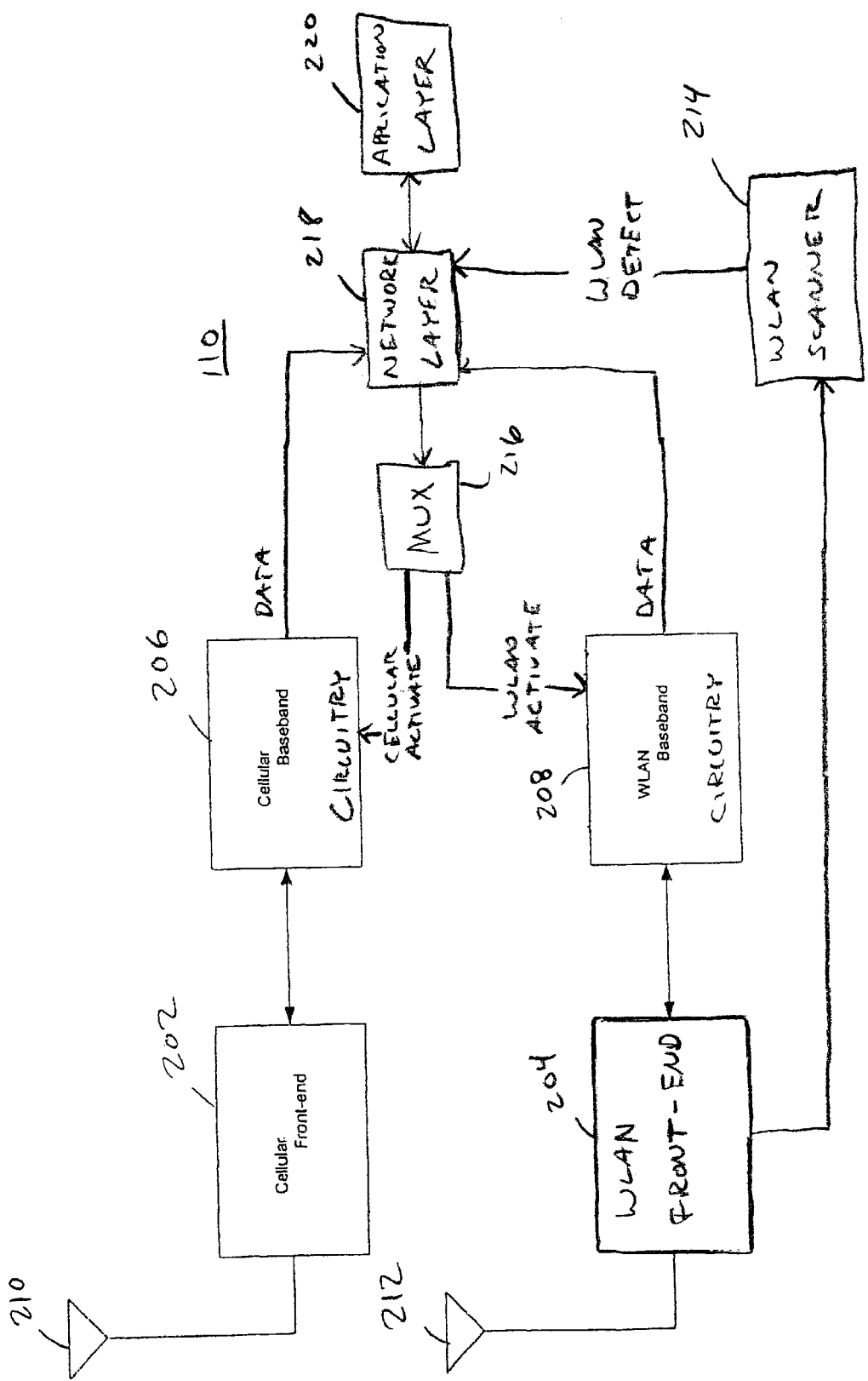
FIG. 2 depicts a high-level block diagram showing one embodiment of a mobile device of FIG. 1 having a wireless local area network (WLAN) scanner in accordance with the present invention.

FIG. 2 depicts a high-level block diagram showing one embodiment of a mobile device 110 adapted for use with the present invention. The mobile device 110 comprises a cellular front end 202 coupled to an antenna 210, a WLAN front end 204 coupled to an antenna 212, cellular baseband circuitry 206, WLAN baseband circuitry 208, multiplexer 216, network layer 218, and application layer 220. Cellular front end 202 transmits and receives radio frequency (RF) signals in a cellular telephone frequency band, which are processed by the cellular baseband circuitry 206. WLAN front end 204 transmits and receives RF signals in a WLAN frequency band, which are processed by the WLAN baseband circuitry 208. The data outputs from the WLAN baseband circuitry 208 and the cellular baseband circuitry 206 are coupled to the network layer 218. The output of the network layer 218 is coupled to the application layer 220 for visual and/or audio display to a user. For example, the mobile device 110 can comprise a cellular telephone. In another example, the mobile device 110 comprises a personal digital assistant (PDA) with a WLAN plug-in card (e.g., a personal computer memory card internal association (PCMCIA) plug-in card).

In accordance with the present invention, a WLAN scanner 214 is coupled between the network layer 218 and the WLAN front end 204 for detecting the presence of a WLAN. Briefly stated, the present invention initiates a WLAN scan to search for the presence of a WLAN. Methods for controllably performing a WLAN scan are described below with respect to FIGS. 10 and 11. Hitherto, the cellular front end 202 has been receiving and transmitting data signals, and the cellular baseband circuitry 206 has been processing the data signals. Upon detecting the presence of a WLAN, the WLAN scanner 214 notifies the network layer 218 that a WLAN is present. The network layer 218 can then activate the WLAN baseband circuitry 208 if desired through the multiplexer 216. That is, the WLAN front end 204 now receives and transmits data signals, and the WLAN baseband circuitry 208 processes the data signals.

When the WLAN baseband circuitry 208 is activated, the cellular baseband circuitry 206 can be deactivated. If the mobile device 110 thereafter moves outside the range of the WLAN, the network layer 218 can activate the cellular baseband circuitry 206 through the multiplexer 216, and the WLAN baseband circuitry 208 can be deactivated. In one embodiment, the network layer 218 activates the cellular baseband circuitry 206 in response to a decrease in the quality of signal at the mobile device 110 below a predetermined threshold (e.g., the mobile device 110 moves outside the range of the WLAN). Those skilled in the art will appreciate that the present invention can be used in other arrangements, such as a mobile device configured only to communicate with a WLAN (e.g., a laptop computer).

Figure 3:
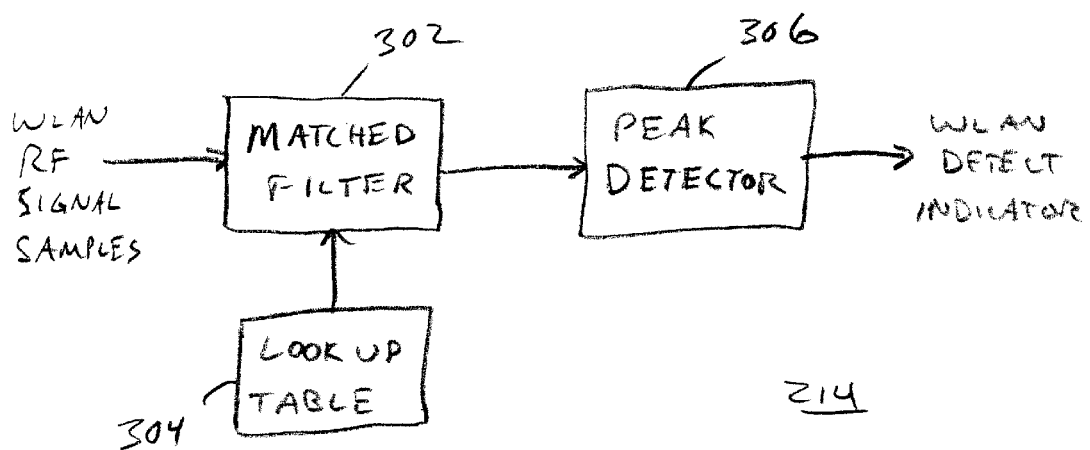
FIG. 3 depicts a block diagram showing one embodiment of the WLAN scanner of FIG. 2.

FIG. 3 depicts a block diagram showing one embodiment of the WLAN scanner 214 of the present invention. As described more fully below, the WLAN scanner 214 operates as a sliding correlator for detecting at least one signature sequence in an RF signal associated with a WLAN. A signature sequence, as used herein, is a sequence of symbols or "chips" that frequently appear in RF signals employed by WLANs. As understood by those skilled in the art, a "chip" is the data object resulting from a bit of data being encoded onto a spreading code. Examples of signature sequences include, but are not limited to, an 11-chip Barker spreading sequence used in IEEE 802.11b WLANs, a sequence of 10 short time-domain symbols at the start of the preamble in IEEE 802.11a WLANS, and a sequence of "A" time-domain symbols at the start of the preamble in ETSI Hiperlan/2 WLANs, and the like.

For example, the modulation format for IEEE 802.11b WLANs is known as direct sequence spread spectrum (DSSS) modulation. For the lower data rates of 1 Mbps and 2 Mbps, the spreading sequence used is an 11-chip Barker sequence. For the higher data rates of 5.5 Mbps and 11 Mbps, the spreading sequence varies over time because the choice of the spreading sequence (four possible sequences in 5.5 Mbps mode, and 64 possible sequences in 11 Mbps mode) actually conveys information. Even these higher data rate modes, however, must transmit the first part of the preamble in a format that is backwards-compatible with the lower data rate modes. Hence, this part of the preamble is also sent using the Barker sequence. The present invention can advantageously employ the Barker sequence to detect the presence of an IEEE 802.11b WLAN.

In another example, the modulation format for IEEE 802.11a and Hiperlan/2 WLANS is known as coded orthogonal frequency division multiplexed (COFDM) modulation. As understood by those skilled in the art, COFDM modulation involves the use of an inverse Fast Fourier Transform (IFFT) process to convert frequency domain symbols into the time-domain at the transmitter, and an FFT process to convert time-domain symbols back into the frequency domain at the receiver. Both standards use a preamble in order to aid the receiver in synchronization. The preamble is split into two parts: The first part is processed in the time-domain (i.e., prior to FFT processing) at the receiver and aids in timing and frequency synchronization. The second part is processed in the frequency domain (i.e., after FFT processing) at the receiver and aids in channel equalization. The first part of the preamble can be processed in the time-domain without activating the FFT processor, which is typically part of the WLAN baseband circuitry and can represent a signification power drain. This time-domain portion of the preamble is known as the short symbols in IEEE 802.11a, and the "A" symbols in Hiperlan/2. The present invention can advantageously employ the short symbols to detect the presence of an IEEE 802.11a WLAN, and the A symbols to detect the presence of a Hiperlan/2 WLAN.

Those skilled in the art will appreciate that the present invention is not limited to WLANs that conform to the standards described above, nor is it limited to WLANs employing the sequences described above. The present invention may be readily adapted for use with other WLANs employing other repetitive sequences of symbols, chips, or the like, which may be shorter or longer than the sequences described above. For example, the present invention can use different types of pseudorandom noise codes, such as Kasami codes, Gold codes, etc., to the extent that such pseudorandom noise codes are employed by WLANs in signal transmission.

Returning to FIG. 3, the WLAN scanner 214 comprises a matched filter 302, a look-up table 304, and a peak detector 306. The matched filter 302 receives samples of the RF signal from the WLAN front end 204. As understood by those skilled in the art, the samples may comprise, for example, in-phase (I) and quadrature (Q) baseband or near baseband samples of the RF signal. The matched filter 302 can comprise a digital delay line and a correlator (not shown) for correlating the samples of the RF signal with a signature sequence indicative of a WLAN stored within the look-up table 304. The matched filter 302 outputs samples proportional to the degree of correlation between the RF signal and the stored signature sequence. The matched filter 302 computes an output for every RF signal sample received.

Periodic peaks in the output of the matched filter 302 correspond to correlations between the RF signal and the stored signature sequence. Between the periodic peaks, the output remains nominally at zero due to the absence of correlation between the RF signal and the stored signature sequence, with minor fluctuations of the signal level being caused by random correlations and noise. The duration between correlation peaks is known as the correlation period. The correlation period includes as many samples are there are in the stored signature sequence. The output of the matched filter 302 is coupled to the peak detector 306. The peak detector 306 senses at least one correlation peak in the output of the matched filter 302, and outputs a WLAN detect indication signal. The WLAN detect indicator can be used to inform the cellular baseband circuitry 206 that a WLAN is present.

Figure 4:
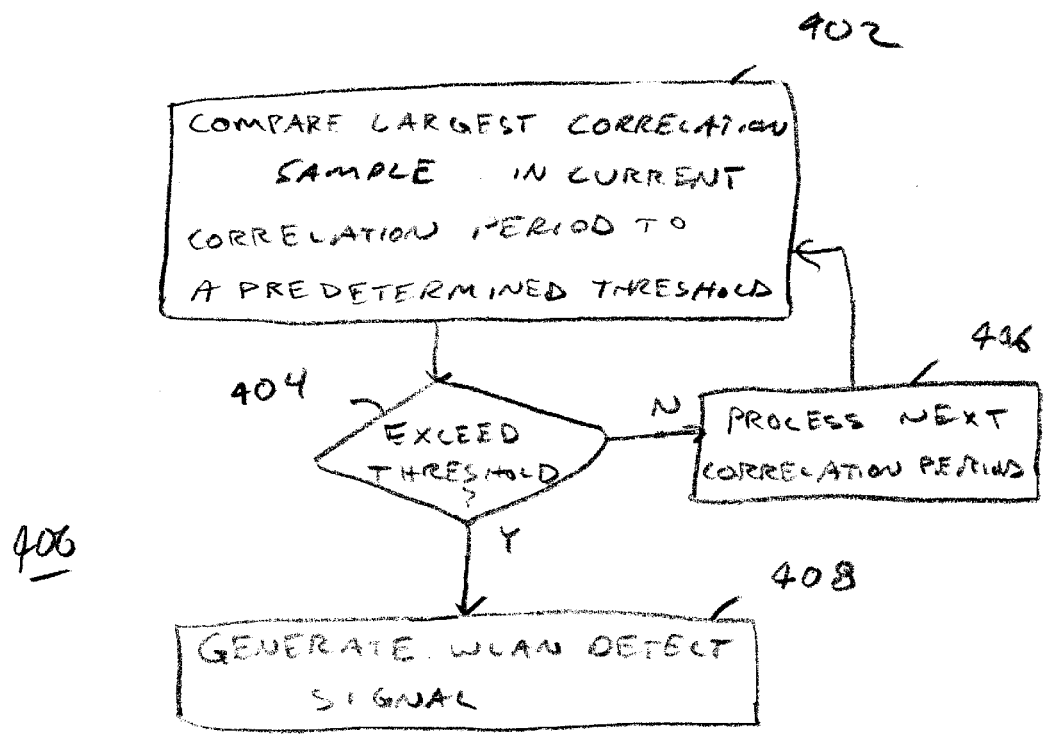
FIG. 4 depicts a flow diagram showing one embodiment of a method for detecting correlation peaks output from a correlator.
Figure 5:
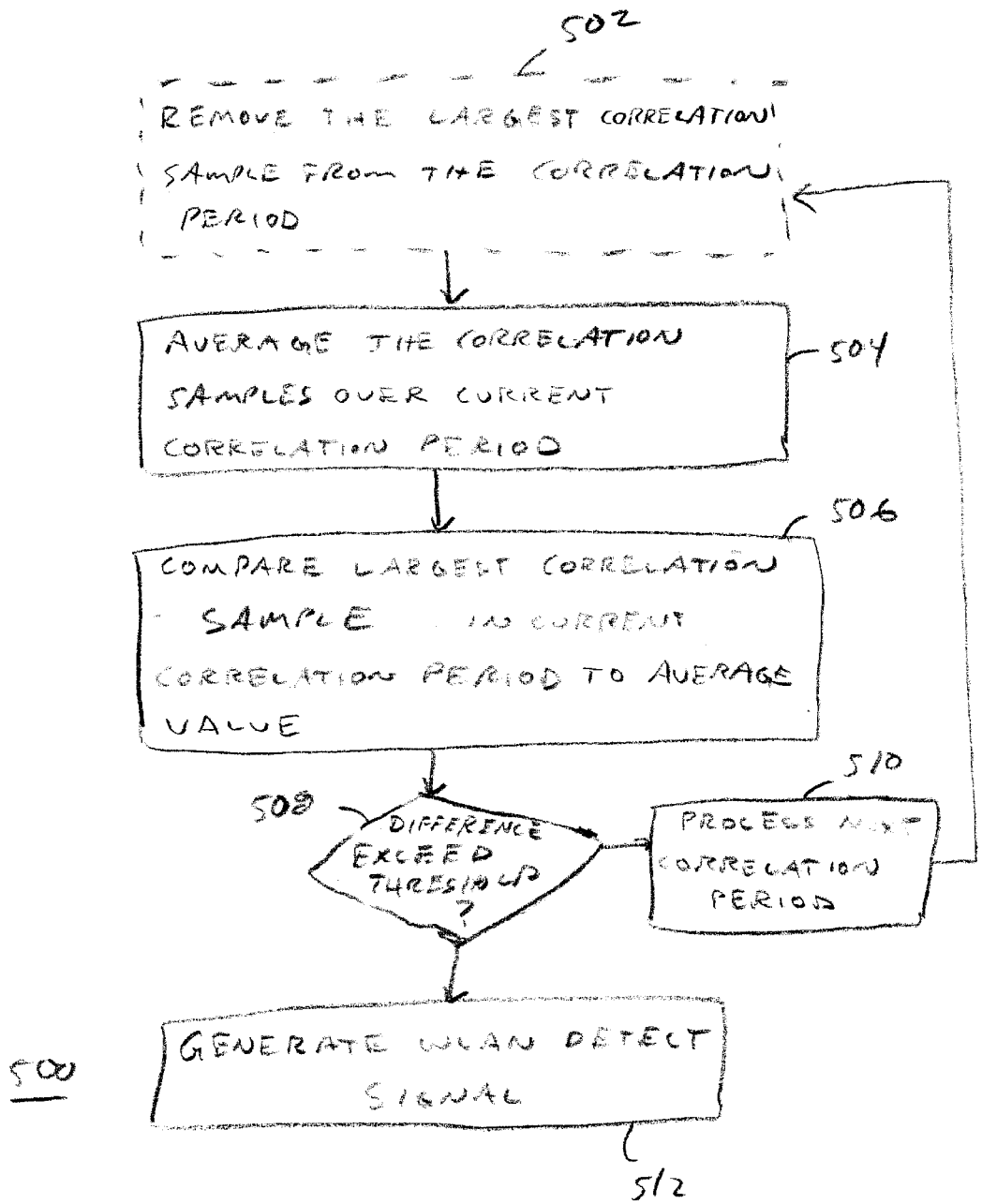
FIG. 5 depicts a flow diagram showing a second embodiment of a method for detecting correlation peaks output from a correlator.
Figure 6:
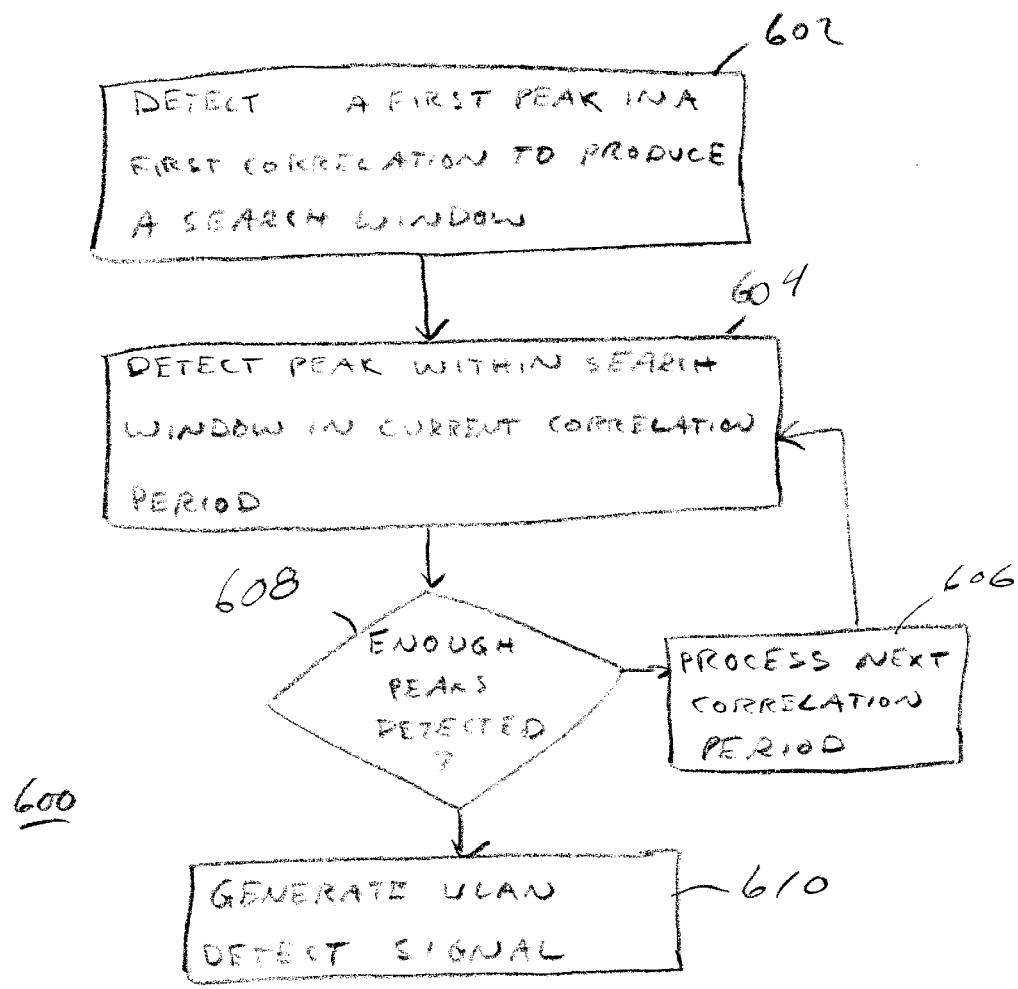
FIG. 6 depicts a flow diagram showing a third embodiment of a method for detecting correlation peaks output from a correlator.

FIGS. 4–6 show embodiments of the operation of the peak detector 306 in accordance with the present invention. The peak detector 306 can be implemented in a processor for executing software stored therein. Alternatively, the peak detector 306 can be implemented as hardware, such as comparators, logic gates, and the like, or as an application specific integrated circuit (ASIC).

FIG. 4 depicts a flow diagram showing one embodiment of a method 400 for detecting correlation peaks. At step 402, the peak detector 306 compares the largest correlation sample in the current correlation period to a predetermined threshold. At step 404, the peak detector 306 determines if the largest sample exceeds the predetermined threshold. If the largest sample does not exceed the predetermined threshold, the peak detector 306 processes the next correlation period at step 406 and returns to step 402. If the largest sample exceeds the predetermined threshold, the peak detector 306 generates a WLAN detect signal at step 408.

FIG. 5 depicts a flow diagram showing another embodiment of a method 500 for detecting correlation peaks. At step 504, the peak detector 306 averages the correlation samples over the current correlation period. The effect of the largest correlation sample can be removed from the average at optional step 502 so that the largest correlation sample does not skew the average. At step 506, the peak detector 306 compares the largest correlation sample in the current correlation period to the computed average value. At step 508, the peak detector 306 determines whether the difference between the largest correlation sample and the average value exceeds a predetermined threshold. If the difference does not exceed the predetermined threshold, the peak detector 306 processes the next correlation period at step 510, and the method 500 returns to step 502. If the difference exceeds the predetermined threshold, the peak detector 306 generates a WLAN detect signal at step 512. This embodiment employs a relative threshold, rather than an absolute threshold, which allows peaks to be detected regardless of reliability of the automatic gain control (AGC) in the WLAN front end 204.

Figure 7:
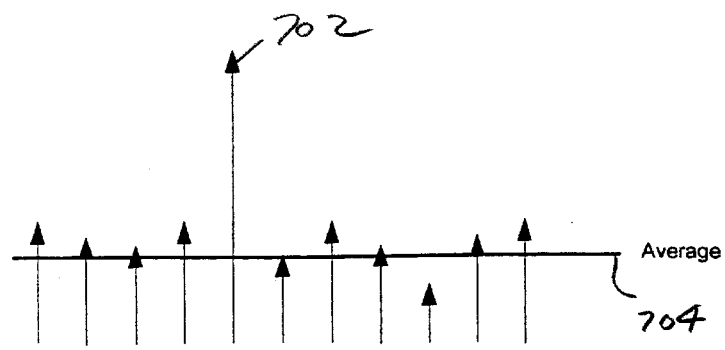
FIG. 7 graphically illustrates the correlation peak detection method of FIG. 5.

FIG. 7 graphically illustrates the method 500 for a given correlation period. In this example, the received RF signal is being correlated against an 11-chip Barker sequence to detect the presence of an IEEE 802.11b WLAN. The stored signature sequence is the 11-chip Barker sequence and, as such, the correlation period has 11 samples. Sample 702 is the largest sample, and the remaining 10 samples are used to compute an average value 704. The largest sample 702 can then be compared to the average value 704 to determine if the difference exceeds a predetermined threshold.

FIG. 6 depicts a flow diagram showing yet another embodiment of a method 600 for detecting correlation peaks. At step 602, the peak detector 306 detects a first correlation peak in a first correlation period to produce a search window. At step 604, the peak detector detects a correlation peak within the search window in a current correlation period. That is, the peak detector 306 employs a search window centered around an estimate of where the next correlation peak should be based on the known correlation period. For example, if the correlation period is 11 samples, then the search window will be centered around the sample that is 11 samples after the first detected correlation peak. The peak detector 306 then determines if enough correlation peaks have been detected at step 608. The number of necessary detected correlation peaks depends on the confidence desired. For example, the method 600 may require the detection of four consecutive correlation peaks. If there have been enough detected correlation peaks, the peak detector 306 generates a WLAN detect signal at step 610. Otherwise, the peak detector 306 processes the next correlation period at step 606. This allows the peak detector to ignore peaks caused by noise, rather than correlations, reducing the probability of a "false alarm" (i.e., false indication of the presence of a WLAN). The peak detector 306 can use the methods of FIGS. 4 and/or 5 to detect the correlation peak.

Figure 8:
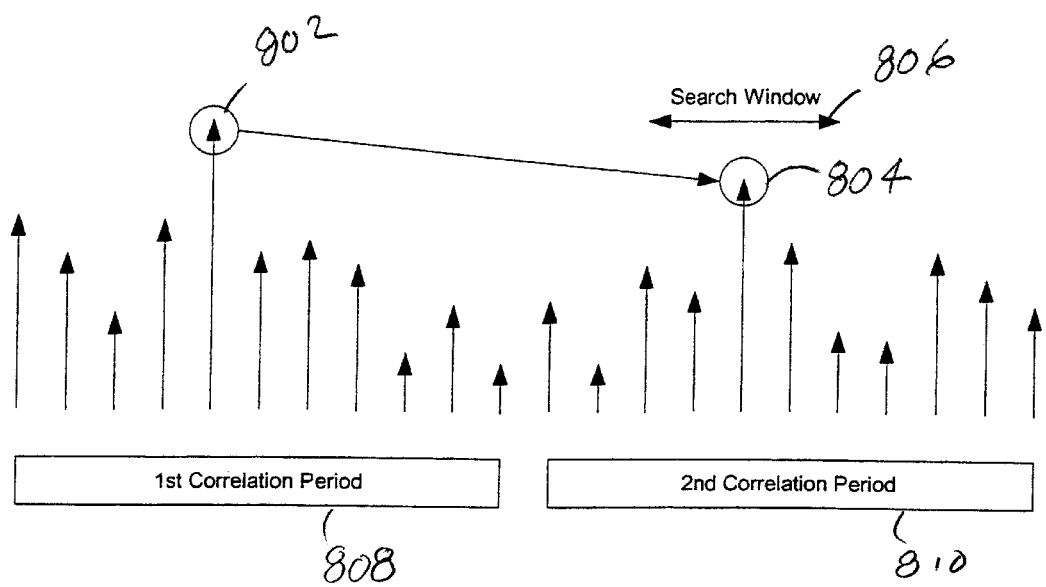
FIG. 8 graphically illustrates the correlation peak detection method of FIG. 6.

FIG. 8 graphically illustrates the method 600 for two correlation periods 808 and 810. In the first correlation period 808, a peak 802 is detected. Again, in this example, there are 11 samples per correlation period. Thus, a search window 806 can be defined such that the peak detector 306 only searches for the next peak 806 approximately one correlation period after the first peak 802. The width of the search window 806 can be any number of samples and is shown in the present example as being five samples wide. In this manner, the present invention can detect several correlation peaks in succession in order to improve the confidence of the WLAN detection.

Figure 9:
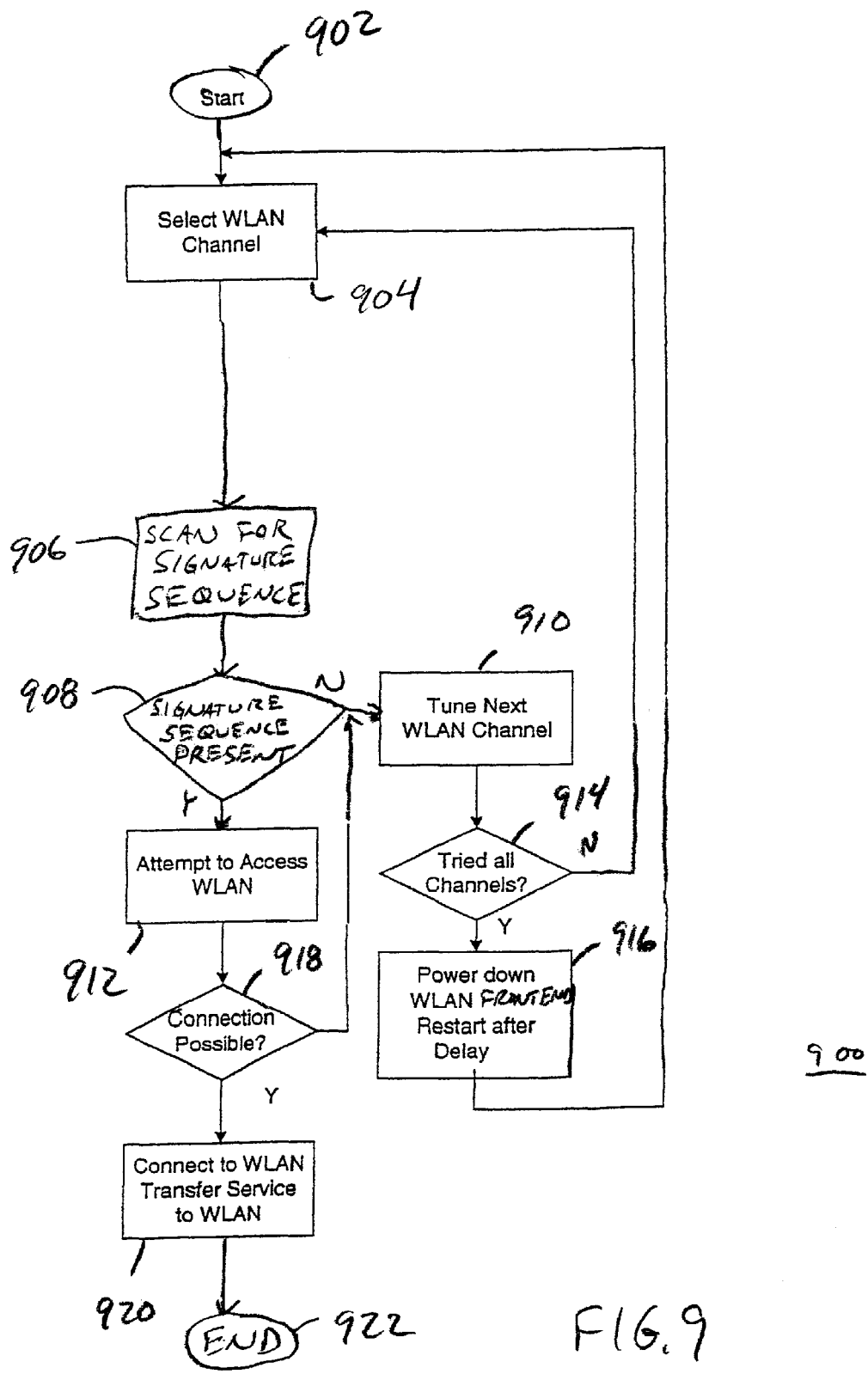
FIG. 9 depicts a flow diagram showing one embodiment of a method of transferring communications in a mobile device from a cellular network to a WLAN embodying the principles of the present invention.

As described above, the WLAN energy detector of the present invention can allow a mobile device to transfer communications from a cellular network to a WLAN when the mobile device is located within the service area of the WLAN. FIG. 9 is a flow diagram showing one embodiment of a method 900 for transferring communications from a cellular network to a WLAN in a mobile device. The method 900 begins at step 902, and proceeds to step 904, where the WLAN front end 204 selects a WLAN channel to process. Hitherto, the cellular front end 202 and the cellular baseband circuitry 206 are active, and the mobile device is communicating with a cellular network. At step 906, the WLAN scanner 214 scans for a signature sequence as described above. If the WLAN scanner 214 detects such a signature sequence, the method 900 proceeds from step 908 to step 912. Otherwise, the method 900 proceeds to step 910.

If the WLAN scanner 214 detects the presence of a WLAN, the WLAN baseband circuitry 208 is activated to determine the accessibility of the WLAN at step 912. If a connection is possible, the method 900 proceeds from step 918 to step 920, where the mobile device transfers communications from the cellular network to the WLAN. If a connection is not possible, the method proceeds from step 918 to step 910. The method 900 ends at step 922.

At step 910, the WLAN front end 204 selects the next WLAN channel to process. If there are no more channels to process, the method 900 proceeds from step 914 to step 916, where the WLAN front end 204 is deactivated and the method re-executed after a predetermined delay. If there are more channels to process, the method 900 proceeds to step 904, where the method 900 is re-executed as described above.

Figure 10:
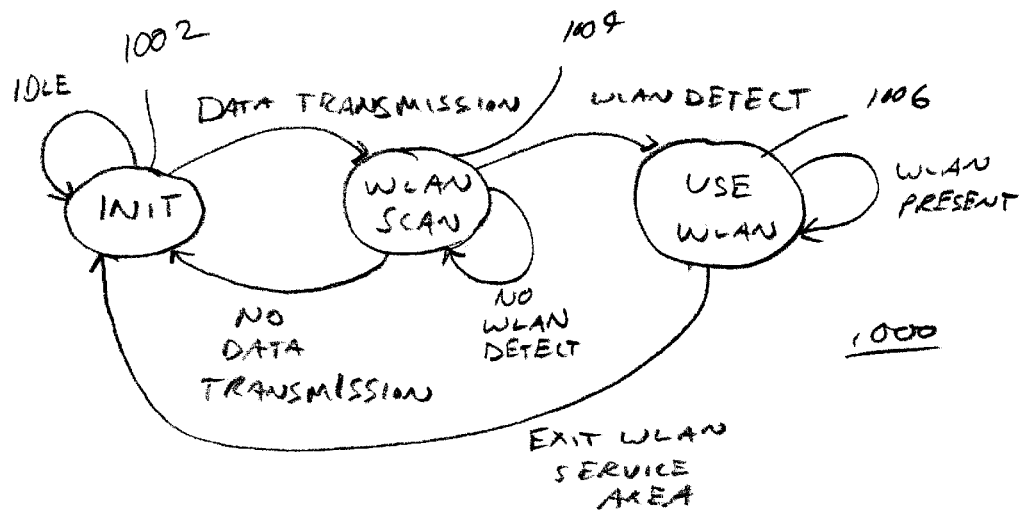
FIG. 10 depicts a state diagram showing one embodiment of a method for controllably performing a scan for a WLAN in a mobile device.

FIG. 10 depicts a state diagram showing one embodiment of a method 1000 for controllably performing a scan for a WLAN in a mobile device. The method 1000 begins at state 1002, wherein the mobile device is initialized and remains idle. The method 1000 proceeds to state 1004 if the WLAN scanner 214 detects a data transmission by the mobile device. For example, the mobile device may begin to communicate with a cellular network, such as checking for electronic mail, or starting a web browser within the mobile device. Hitherto, the WLAN scanner 214 has been inactive. At state 1004, the WLAN scanner 214 scans for a WLAN as described above. The WLAN scanner 214 continues to search for a WLAN until the mobile device ceases data transmission. If there is no data transmission by the mobile device, the method 1000 returns to state 1002, where the WLAN scanner 214 is inactive. If a WLAN is detected by the WLAN scanner 214, the method 1000 proceeds to state 1006, where the mobile device begins to use the WLAN, as described above. The mobile device continues to use the WLAN for as long as the mobile device is within the service area of the WLAN. Upon exiting the service area of the WLAN, the method 1000 returns to state 1002.

Figure 11:
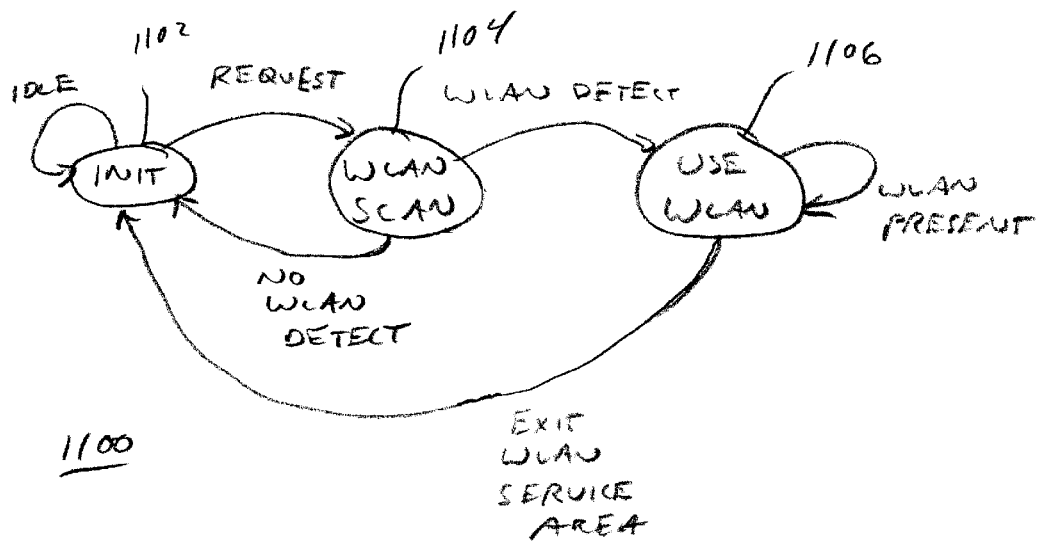
FIG. 11 depicts a state diagram showing another embodiment of a method for controllably performing a scan for a WLAN in a mobile device.

FIG. 11 depicts a state diagram showing another embodiment of a method 1100 for controllably performing a scan for a WLAN in a mobile device. The method 1100 begins a state 1102, wherein the mobile device is initialized and remains idle. The method 1100 proceeds to state 1104 if the WLAN scanner 214 detects a request from the mobile device to begin a WLAN scan. Hitherto, the WLAN scanner 214 has been inactive. For example, a user can manually request a WLAN scan by pushing a button on the mobile device, or by selecting a menu option, for example. This allows a user to only perform data transmission if the user can do so over a WLAN. If the cellular network is the only means of data transmission, the user can choose to forgo data transmission until such time as a WLAN service is available.

In another example, a user can set the frequency of WLAN scanning. That is, The WLAN scanner 214 can receive requests for a WLAN scan periodically or according to a fixed schedule. The frequency of WLAN scan can be a menu option within the mobile device, for example. Reducing the frequency of WLAN scanning conserves battery power in the mobile device, but introduces latency into the WLAN detection process, since the scanning will not occur as frequently. Increasing the frequency of WLAN scanning will result in quicker WLAN detection with attendant drawbacks in battery performance.

In yet another example, the request for WLAN scan can be generated by the user activating a WLAN scanning feature. Specifically, the mobile device can possess a WLAN scanning feature that be toggled on and off. If the WLAN scanning feature is toggled on, the request can be transmitted to the WLAN scanner 214 as a manual request or a periodic request. In addition, the WLAN scanning feature option can be used with the embodiment described above with respect to FIG. 10. A user could disable WLAN scanning when the user is making a data transmission, but knows that there is no WLAN coverage in the area (e.g., the user is in a car on the highway). Disabling the WLAN scanning feature conserves battery power.

In any case, at state 1104, the WLAN scanner 214 scans for a WLAN as described above. If a WLAN is not detected, the method 1100 returns to state 1102. If a WLAN is detected, the method 1100 proceeds to state 1104, wherein the mobile device begins to use the WLAN, as described above. The mobile device continues to use the WLAN for as long as the mobile device is within the service area of the WLAN. Upon exiting the service area of the WLAN, the method 1100 returns to state 1102.

While the foregoing is directed to the preferred embodiment of the present invention, other and further embodiments of the invention may be devised without departing from the basic scope thereof, and the scope thereof is determined by the claims that follow.

What is claimed:

1. A method, comprising:

detecting at least one signature sequence in a radio frequency (RF) signal associated with a wireless local area network (WLAN); and indicating the presence of the WLAN in response to the detection of the at least one signature sequence, wherein the detecting step includes filtering samples of the RF signal to correlate the RF signal with a stored signature sequence indicative of the WLAN and sensing at least one peak in the filtered RF signal.

2. The method of claim 1, further comprising:

activating circuitry in a mobile device configured to communicate with the WLAN in response to the detection of the at least one signature sequence.

3. The method of claim 2, further comprising:
  transferring communications in the mobile device from a wireless communication system to the WLAN.

4. The method of claim 3, wherein the wireless communication system is a cellular telephone network.

5. The method of claim 1, further comprising:
  deactivating the circuitry in the mobile device configured to communicate with the WLAN in response to a decrease below a predetermined threshold in quality of signal received from the WLAN.

6. The method of claim 1, wherein the at least one signature sequence is at least one of a Barker sequence, a short symbol sequence associated with an IEEE 802.11a WLAN, and an A symbol sequence associated with a Hiperlan/2 WLAN.

7. The method of claim 1, wherein the sensing step comprises:
  comparing the largest sample of the RF signal in a correlation period to a predetermined threshold.

8. The method of claim 1, wherein the sensing step comprises:
  averaging the samples of the RF signal over a correlation period to produce an average value; and
  comparing the largest sample of the RF signal in the correlation period with the average value to determine if the comparison exceeds a predetermined threshold.

9. The method of claim 8, wherein the largest sample of the RF signal is removed from the average value.

10. The method of claim 1, wherein the sensing step comprises:
  detecting a first peak in a first correlation period to produce a search window; and
  detecting at least one additional peak in the search window for at least one additional correlation period.

11. An apparatus, comprising:
  a detector for detecting at least one signature sequence in a radio frequency (RF) signal associated with a wireless local area network (WLAN); and
  means for indicating the presence of the WLAN in response to the detection of the at least one signature sequence,
  wherein the detector includes a matched filter for correlating samples of the RF signal with a stored signature sequence indicative of the WLAN and a peak detector for sensing at least one peak in the filtered RF signal.

12. The apparatus of claim 11, further comprising:
  means for activating circuitry in a mobile device configured to communicate with the WLAN in response to the detection of the at least one signature sequence.

13. The apparatus of claim 12, further comprising:
  means for transferring communications in the mobile device from a wireless communication system to the WLAN.

14. The apparatus of claim 13, wherein the wireless communication system is a cellular telephone network.

15. The apparatus of claim 11, further comprising:
  deactivating circuitry in the mobile device configured to communicate with the WLAN in response to a decrease below a predetermined threshold in quality of signal received from the WLAN.

16. The apparatus of claim 11, wherein the at least one signature sequence is at least one of a Barker sequence, a short symbol sequence associated with an IEEE 802.11a WLAN, and an A symbol sequence associated with a Hiperlan/2 WLAN.

17. The apparatus of claim 15, wherein the peak detector is configured to compare the largest sample of the RF signal in a correlation period to a predetermined threshold.

18. The apparatus of claim 15, wherein the peak detector is configured to:
  average the samples of the RF signal over a correlation period to produce an average value; and
  compare the largest sample of the RF signal in the correlation period with the average value to determine if the comparison exceeds a predetermined threshold.

19. The apparatus of claim 18, wherein the peak detector is further configured to:
  remove the effect of the largest sample of the RF signal from the average value.

20. The apparatus of claim 15, wherein the peak detector is configured to:
  detect a first peak in a first correlation period to produce a search window; and
  detect at least one additional peak in the search window for at least one additional correlation period.

21. In a mobile device configured to communication with a wireless communication network and a wireless local area network (WLAN), an apparatus comprising:
  a first front end for receiving an RF signal associated with the wireless communication system;
  a second front end for receiving an RF signal associated with the WLAN;
  a first baseband circuit for processing the RF signal received by the first front end;
  a second baseband circuit for processing the RF signal received by the second front end; and
  a WLAN scanner for detecting at least one signature sequence in the RF signal associated with the WLAN and for indicating the presence of the WLAN in response to the detection of the at least one signature sequence.

* * * * *